US010523261B2

(12) United States Patent
Shah et al.

(10) Patent No.: US 10,523,261 B2
(45) Date of Patent: Dec. 31, 2019

(54) CO-CHANNEL WIRELESS DETECTION

(71) Applicant: APPLE INC., Cupertino, CA (US)

(72) Inventors: Tushar Ramanlal Shah, Cupertino, CA (US); Joseph Hakim, Boulder Creek, CA (US)

(73) Assignee: APPLE INC., Cupertino, CA (US)

( * ) Notice: Subject to any disclaimer, the term of this patent is extended or adjusted under 35 U.S.C. 154(b) by 149 days.

(21) Appl. No.: 15/087,989

(22) Filed: Mar. 31, 2016

(65) Prior Publication Data

US 2017/0288723 A1      Oct. 5, 2017

(51) Int. Cl.
| | |
|---|---|
| *H04B 1/401* | (2015.01) |
| *H04B 1/16* | (2006.01) |
| *H04B 1/525* | (2015.01) |
| *H04L 5/14* | (2006.01) |
| *H04L 27/00* | (2006.01) |
| *H04L 27/26* | (2006.01) |
| *H04W 16/14* | (2009.01) |
| *H04W 88/06* | (2009.01) |

(52) U.S. Cl.
CPC ............. *H04B 1/401* (2013.01); *H04B 1/16* (2013.01); *H04B 1/525* (2013.01); *H04L 5/1461* (2013.01); *H04L 27/0012* (2013.01); *H04L 27/2666* (2013.01); *H04W 16/14* (2013.01); *H04W 88/06* (2013.01)

(58) Field of Classification Search
CPC ......... H04B 1/401; H04B 1/16; H04B 1/525; H04W 88/06; H04W 16/14; H04L 27/0012; H04L 27/2666; H04L 5/1461
USPC ....... 455/412.1–412.2, 418–422.1, 436, 444, 455/552.1, 456.1, 67.11, 67.13, 509, 455/41.1–41.2; 370/328–332, 338, 335; 375/316, 324, 325, 340
See application file for complete search history.

(56) References Cited

U.S. PATENT DOCUMENTS

| | | | | |
|---|---|---|---|---|
| 4,656,432 | A * | 4/1987 | Matsumura ............ | H03D 3/007 329/316 |
| 5,107,335 | A * | 4/1992 | Nishiyama .............. | H03J 7/065 348/725 |
| 5,400,359 | A * | 3/1995 | Hikoso ................... | H04B 1/707 375/133 |
| 5,422,912 | A * | 6/1995 | Asser .................... | G01S 7/2921 375/350 |
| 5,761,211 | A * | 6/1998 | Yamaguchi ............ | H04L 7/042 375/224 |
| 6,023,608 | A * | 2/2000 | Yrjola .................... | H01P 1/205 333/204 |

(Continued)

FOREIGN PATENT DOCUMENTS

| | | |
|---|---|---|
| EP | 2637313 A1 | 9/2013 |
| WO | 2014081421 A1 | 5/2014 |

OTHER PUBLICATIONS

International Search Report and Written Opinion for PCT Application No. PCT/US2017/018279 dated May 19, 2017; 13 pgs.

*Primary Examiner* — Babar Sarwar
(74) *Attorney, Agent, or Firm* — Fletcher Yoder PC (57) ABSTRACT

An electronic device includes an antenna configured to receive a wireless signal. The electronic device also includes a first correlator configured to correlate the wireless signal to a communication of a first wireless protocol type and a second correlator configured to correlate the wireless signal to a communication of a second wireless protocol type.

18 Claims, 8 Drawing Sheets

(56) References Cited

U.S. PATENT DOCUMENTS

| | | | | |
|---|---|---|---|---|
| 6,289,204 B1* | 9/2001 | Estes | H01P 1/15 | 333/103 |
| 6,298,227 B1* | 10/2001 | Molnar | H03J 7/02 | 455/226.1 |
| 6,708,027 B1* | 3/2004 | Sasson | H03D 7/161 | 455/207 |
| 7,848,715 B2* | 12/2010 | Boos | H02M 3/156 | 370/318 |
| 7,904,041 B2* | 3/2011 | Feher | H04W 64/00 | 455/151.1 |
| 8,607,318 B2* | 12/2013 | Huang | G06F 21/35 | 380/270 |
| 2002/0071477 A1* | 6/2002 | Orava | H04L 7/042 | 375/132 |
| 2004/0120421 A1* | 6/2004 | Filipovic | H04B 1/406 | 375/316 |
| 2005/0059400 A1* | 3/2005 | Jagadeesan | H04W 36/30 | 455/436 |
| 2005/0153654 A1* | 7/2005 | Anderson | H04W 56/001 | 455/12.1 |
| 2005/0180364 A1* | 8/2005 | Nagarajan | H04K 3/228 | 370/335 |
| 2005/0265293 A1* | 12/2005 | Ro | H04B 1/7083 | 370/335 |
| 2005/0266818 A1* | 12/2005 | Johnson | H03D 7/00 | 455/260 |
| 2006/0141978 A1* | 6/2006 | Liu | H03H 7/0115 | 455/333 |
| 2007/0111746 A1* | 5/2007 | Anderson | H04W 52/223 | 455/522 |
| 2007/0238480 A1* | 10/2007 | Lin | H04W 52/241 | 455/522 |
| 2008/0026709 A1* | 1/2008 | Liu et al. | H04B 1/0067 | 455/121 |
| 2008/0075147 A1* | 3/2008 | Grossman | H04L 1/0036 | 375/136 |
| 2008/0252283 A1* | 10/2008 | McAnally | G01F 1/8413 | 324/76.78 |
| 2009/0067378 A1* | 3/2009 | Luo | H04B 7/068 | 370/329 |
| 2009/0076803 A1* | 3/2009 | Feher | H04M 3/382 | 704/201 |
| 2010/0067618 A1* | 3/2010 | Qi | H04L 25/067 | 375/324 |
| 2010/0216459 A1* | 8/2010 | Yu | H04J 11/0069 | 455/434 |
| 2012/0213162 A1* | 8/2012 | Koo | H04W 16/14 | 370/329 |
| 2013/0207872 A1* | 8/2013 | Bakalski | H04B 1/0458 | 343/860 |
| 2013/0242939 A1* | 9/2013 | Wagner | H04L 1/0003 | 370/331 |
| 2013/0258951 A1* | 10/2013 | Dulai | G06F 3/1205 | 370/328 |
| 2014/0080427 A1* | 3/2014 | Babitch | H04B 15/04 | 455/78 |
| 2014/0091641 A1* | 4/2014 | Ichikawa | B60L 53/65 | 307/104 |
| 2014/0104132 A1* | 4/2014 | Bakalski | H03H 7/38 | 343/861 |
| 2014/0199991 A1* | 7/2014 | Mukherjee | H03M 13/612 | 455/422.1 |
| 2015/0119026 A1* | 4/2015 | Bodduru | H04W 76/16 | 455/434 |
| 2015/0208253 A1* | 7/2015 | Kim | H04W 24/02 | 370/252 |
| 2015/0214995 A1* | 7/2015 | Kanemaru | H04B 1/0458 | 455/83 |
| 2016/0269052 A1* | 9/2016 | Pawliuk | H04B 1/10 | |
| 2016/0285505 A1* | 9/2016 | Lee | H04B 1/62 | |
| 2017/0033891 A1* | 2/2017 | Alexander | H04L 1/0036 | |
| 2017/0288723 A1* | 10/2017 | Shah | H04B 1/525 | |
| 2018/0206243 A1* | 7/2018 | Andou | H04W 72/04 | |

* cited by examiner

CO-CHANNEL WIRELESS DETECTION

BACKGROUND

The present disclosure relates generally to techniques for determining a wireless protocol for an incoming wireless message.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication devices (e.g., smartphones, wearable devices, etc.) are proliferating. Many wireless communication devices support multiple communication protocols on the same platform. For example, wireless communication devices may use Long-Term Evolution (LIE), Wideband Code Division Multiple Access (WCDMA), wireless local area networks (WLAN), Bluetooth, Global Positioning System (GPS), Near-Field Communication (NFC), and/or other suitable wireless communication protocols. Moreover, incoming data may be received at a common antenna, and the data is to be interpreted according to which communication protocol the data is encoded in. Furthermore, some wireless protocols may overlap in frequency or have harmonics of transmitted signal that fall within a frequency spectrum of another wireless protocol. In some cases, the harmonics of transmitted signal of second wireless protocol may have a stronger signal strength compared to the desired signal for the first wireless protocol. Thus, an incoming wireless packet may be improperly identified. However, such data, if interpreted wrongly, may be lost when translated improperly by the wrong wireless protocol translator (e.g., WLAN data demodulator) rather than the proper wireless protocol translator (e.g., LTE data demodulator).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosure teaches a wireless confirmation system that uses at least one determination to determine whether an incoming data packet is of a first wireless protocol or whether at least a portion of the incoming data is attributable to a second wireless protocol. For instance, there may be an existence of harmonics of the second wireless protocol in the incoming data. These harmonics or other replicas of the second wireless protocol may interfere with the decoding of the first wireless protocol type. In other words, the harmonics may cause false positives or negatives of a detection of a signal in the first wireless protocol. Accordingly, an electronic device includes a first correlator for the first wireless protocol and a second correlator for the second wireless protocol from a common antenna. In some cases, frequencies corresponding to a detected second wireless protocol may be filtered from the received signal.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Around 1.76 billion people now own and use smartphones. By 2017, more than one-third of all people around the globe are expected to be smartphone users. High penetration of smart phones combined with wide availability of low cost microelectromechanical systems (MEMS) sensors have increased proliferation of smart devices (e.g., wearable devices).

Many smart devices, such as smartphones, wearable devices, tablets, and computers, support multiple communication protocols on the same platform, such as LTE, WCDMA, WLAN, Bluetooth GPS, and NFC. Support of co-located cellular communication protocols (like LTE) and wireless connectivity protocols (like WLAN) impose stringent coexistence difficulties, such as overlapping frequencies of transmission. Thus, the disclosure includes an additional wireless protocol correlator to confirm whether a received data includes harmonics of another wireless protocol.

Figure 1:
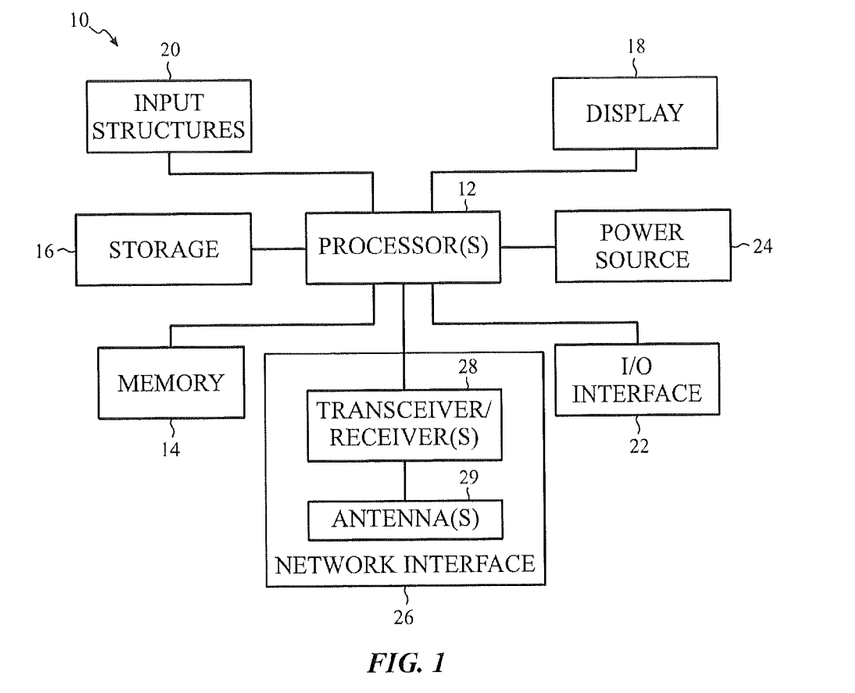
FIG. 1 is a schematic block diagram of an electronic device including wireless transceiver(s)/receiver(s), in accordance with an embodiment.

With the foregoing in mind, a general description of suitable electronic devices that may use cross-wireless protocol circuitry. Turning first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and network interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., e.g., pressing a button to increase or decrease a volume level). The I/O interface 22 may enable electronic device 10 to interface with various other electronic devices. The I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include a power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The network interface(s) 26 enable the electronic device 10 to connect to one or more network types. The network interface(s) 26 may also include, for example, interfaces for a personal area network (e.g., PAN), such as a Bluetooth network, for a local area network (e.g., LAN) or wireless local area network (e.g., WLAN), such as an 802.11x Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The network interface(s) 26 may also include interfaces for, for example, broadband fixed wireless access networks (e.g., WiMAX), mobile broadband Wireless networks (e.g., mobile WiMAX), and so forth. The network interface(s) 26 include transceiver/receiver(s) 28 and antenna(s) 29. The transceiver/receiver(s) 28 may include one or more receivers and/or transmitters that are configured to send and/or receive information via one or more respective antennas of the antenna(s) 29. Each transceiver/receiver 28 may be connected to its own antenna 29. Alternatively, at least some of the transceiver/receiver(s) 28 may share an antenna 29.

Figure 2:
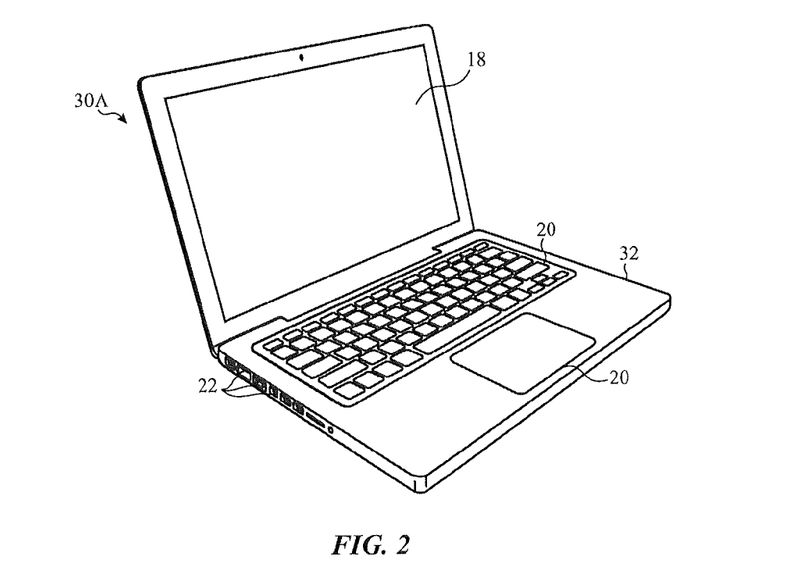
FIG. 2 is a perspective view of a notebook computer representing an embodiment of the electronic device of FIG. 1, in accordance with an embodiment.
Figure 3:
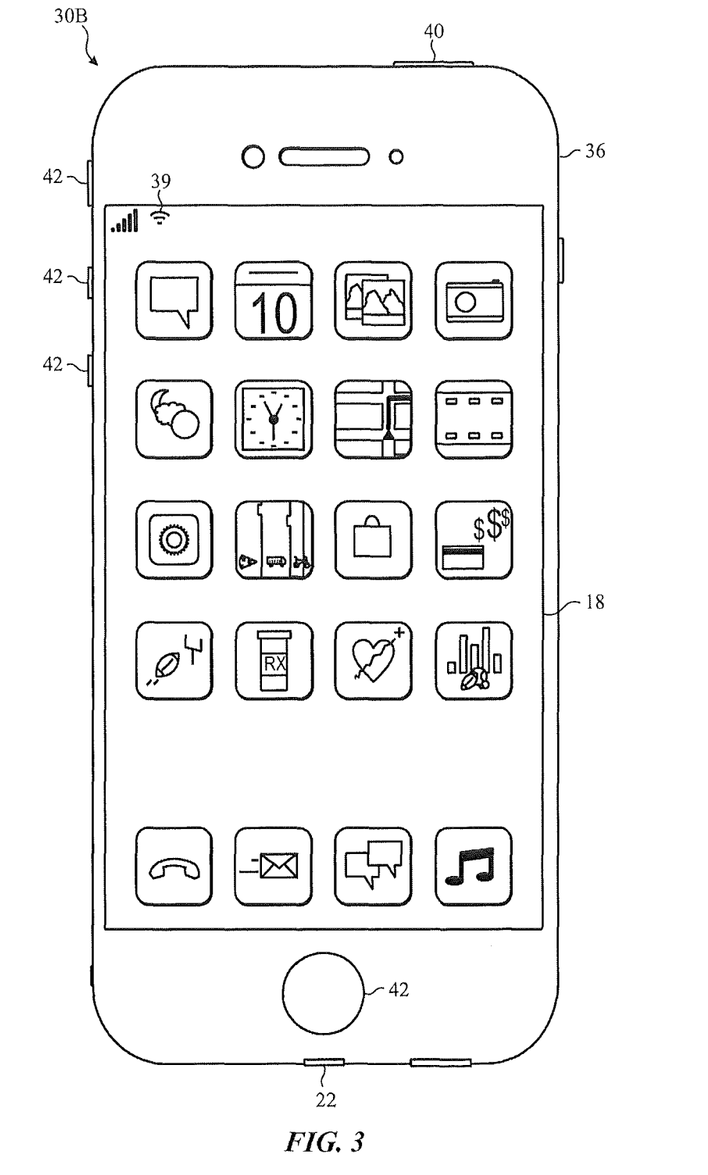
FIG. 3 is a front view of a hand-held device representing another embodiment of the electronic device of FIG. 1, in accordance with an embodiment.
Figure 4:
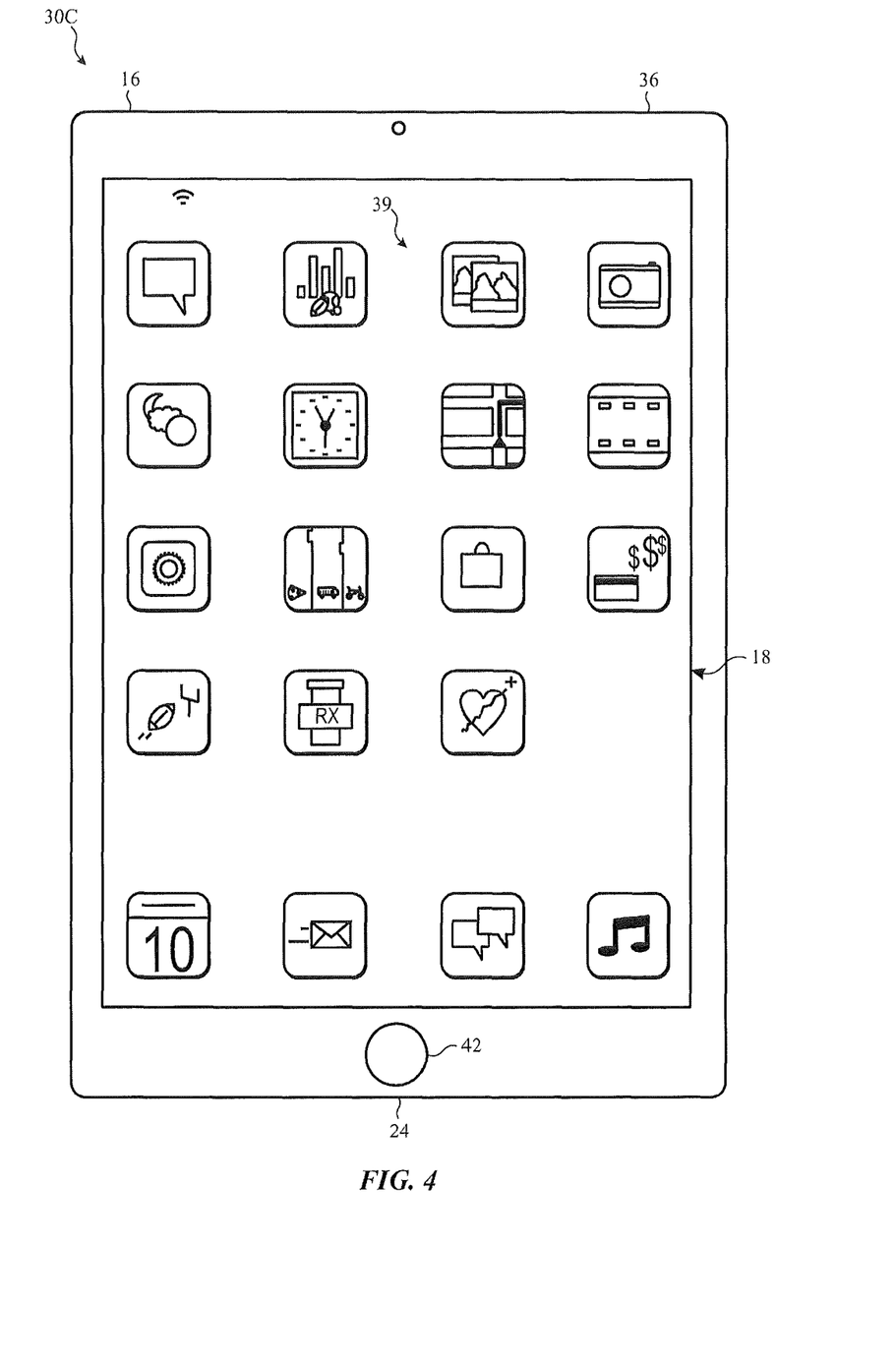
FIG. 4 is a front view of another hand-held device representing another embodiment of the electronic device of FIG. 1, in accordance with an embodiment.
Figure 5:
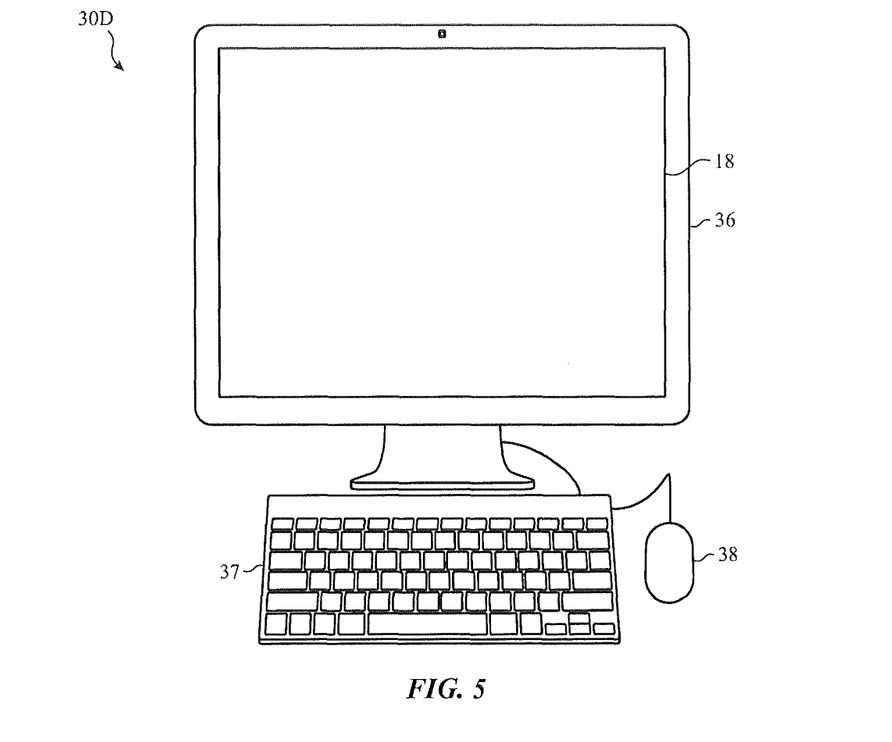
FIG. 5 is a front view of a desktop computer representing another embodiment of the electronic device of FIG. 1, in accordance with an embodiment.
Figure 6:
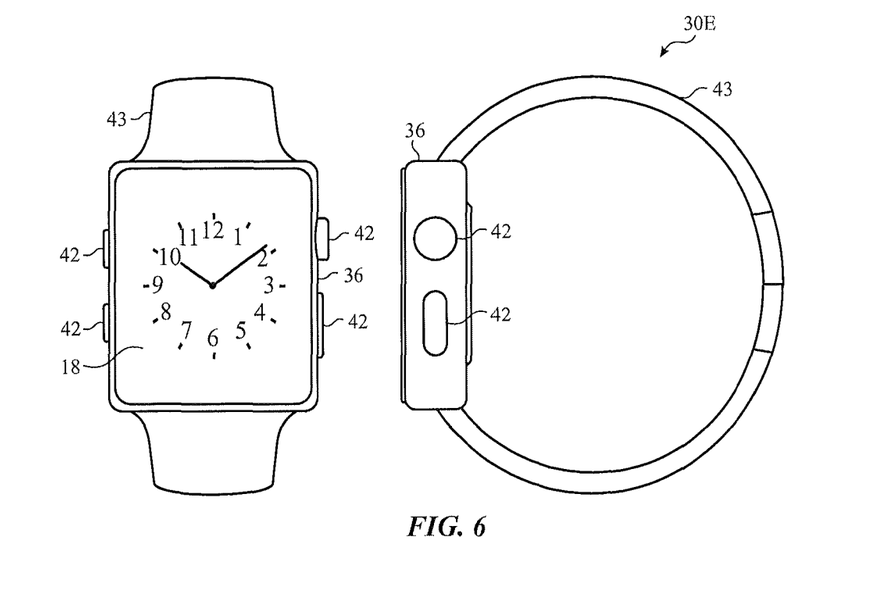
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 22 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 40 and 42 (illustrated embodiments of the input structures 20), in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 20 may also include a microphone may obtain a user's voice for various voice-related features, and a speaker to allow for audio playback and/or certain phone capabilities. The input structures 42, 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 37 or mouse 38, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, an organic light emitting diode display, an active-matrix organic light emitting diode (e.g., AMOLED) display, and so forth), which may allow users to interact with a user interface of the wearable electronic device 30E.

Figure 7:
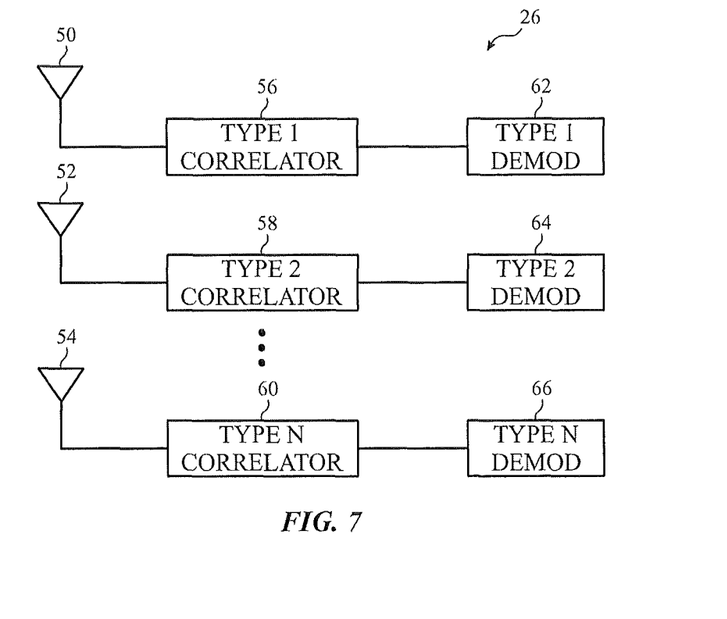
FIG. 7 is a schematic view of multiple channels for receiving wireless signals for a variety of wireless protocols, according to an embodiment.

As previously discussed, some wireless devices may receive multiple different signals. FIG. 7 illustrates an embodiment of the network interface 26. The illustrated embodiment of the network interface 26 includes antennas 50, 52, and 54 that are configured to transmit and/or receive data wirelessly. Although the illustrated embodiment includes three antennas and related handling circuitry, some embodiments of the network interface 26 include 1, 2, 3, 4, or more antennas and related handling circuitry. In some embodiments, each antenna 50, 52, and 54 may include one or more separate antennas. Moreover, each antenna 50, 52, and 54 may receive data of a particular wireless protocol (e.g., WiFi, LTE, etc.). In the illustrated embodiment, each antenna 50, 52, and 54 couples to a wireless protocol correlator 56, 58, and 60, respectively. In some embodiments, each antenna (e.g., antenna 50) may couple to more than a single correlator each having a different wireless protocol associated therewith. The wireless protocol correlators 56, 58, and 60 determine whether a received signal correspond to a wireless communication type (e.g., a particular wireless protocol) that can be handled by a respective type demodulator 62, 64, or 66. Furthermore, in some embodiments, at least one type correlator may be omitted. Instead, in such embodiments, the type demodulator that does not correspond to a type correlator may operate on a received signal when no other wireless communication type is correlated.

Figure 8:
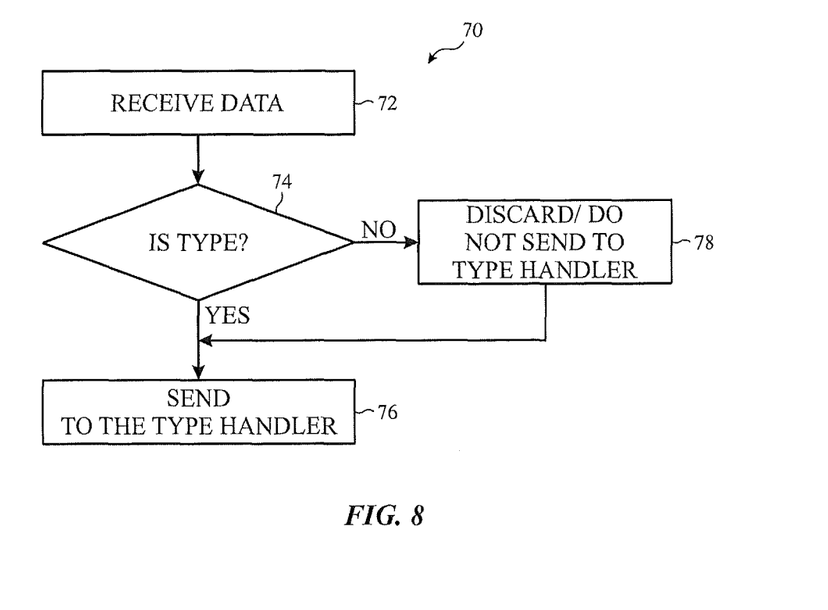
FIG. 8 illustrates a flowchart of a process for determining when to decode data using a specific wireless protocol, according to an embodiment.

FIG. 8 illustrates an embodiment of a process 70 that may be employed by one or more type correlators (e.g., one of the type correlators 56, 58, or 60). The type correlator receives data from an antenna (block 72). In some embodiments, this data may be altered, for example, the data may first be demodulated, converted from analog to digital, filtered, and/or had other signal manipulation performed thereon before being received by the correlator. Upon receiving the signal whether altered or unaltered, the correlator determines whether the received data corresponds to what an expected wireless communication of that type would appear (block 74). If the signal correlates to a wireless communication type that may be handled by a demodulator, the correlator sends the data to the type demodulator (block 76). In some embodiments, the signal is sent to the demodulator at or around the same time that it is sent to the correlator, and the correlator sends an enable signal to the type demodulator to enable the demodulator to initiate processing (e.g., demodulation) the received signal. If the correlator determines that the data does not correlate to the wireless protocol type, the correlator does not send the data to the demodulator (block 78). In some embodiments, any data that is not sent to the demodulator while the demodulator is not enabled is discarded or lost.

As discussed previously, wireless protocol may use numerous different frequency bands. For example, different countries in the world use different LTE frequency bands. The 3GPP LTE standard TS 36.101 V12.3.0 (2014-03) currently defines many frequency bands (e.g., 46) with new bands continuously added to the standard to be supported by smartphones and wearable devices. These frequency bands are currently located at radio frequencies between 450 MHz and 5000 MHz. The number of LTE frequency bands is projected to increase even more as new spectrums become available for LTE. WLAN connectivity on the other hand operates in at least two frequency bands—one located at 2.4 GHz radio frequency (2400 MHz-2483.5 MHz) and other located at 5 GHz radio frequency (5150 MHz-5925 MHz). Smart devices support multiple LTE bands so to be used in most of the countries all over the world. Smart devices also support 2.4 GHz and 5 GHz WLAN bands.

To use throughput on cellular and on connectivity protocols properly, a smart device should be able to concurrently operate in two protocols. Concurrent use of multiple communication protocols co-located on a smart device platform imposes new challenges for wireless receivers. Support for concurrent operation requires supporting a scenario where a smart device is transmitting a first wireless protocol (e.g., LTE) packet at the same time as it is receiving a second wireless protocol (e.g., WLAN) packet. LTE transmitters use high power amplifiers to amplify the LTE uplink signal to up to 27 dBm (500 mW) output power. Even after accounting for the insertion loss in the RF front-end this enables transmission of LTE uplink signal with RF power of +23 dBm (200 mW) at the antenna connector of the platform. The transmission of high power LTE uplink signal enables data and VoLTE services for a user located at the edge of the LTE cell. During the amplification of the LTE signal, the high power amplifier generates harmonics at multiples of the LTE transmission frequency. The RF power in the harmonics depends on the RF output power of the LTE signal and the design of the LTE high power amplifier. For some LTE bands, the harmonic signal falls directly in the 2.4G and 5G WLAN bands. For example, a third harmonic of LTE band B1, B2, B3, B4, B25, and B39 falls into 5 GHz WLAN receive band. A second harmonic of B38 and B41 also falls into 5 GHz WLAN receive band. A third harmonic of LTE bands B18, B26, and B27 falls into 2.4 GHz WLAN receive band.

Moreover, LTE uplink transmission is done in increments of Resource Blocks (RB). Each RB consists of 12 consecutive sub-carriers (180 kHz total BW) and has a time duration of one slot (0.5 ms). The number of resource blocks allocated to uplink LTE signal depends on actual usage scenario like VoLTE, uplink FTP, etc. Depending on usage scenario, the RB allocation for LTE uplink signal can vary from 1 RB (180 kHz BW) to maximum number of RBs supported by given LTE channel bandwidth. For a 20 MHz BW LTE signal, the maximum number of RBs is 100 and 100 RBs occupy 18 MHz total BW. The second harmonic of LTE signal has approximately two times the bandwidth of LTE signal. The third harmonic of LTE signal has approximately three times the bandwidth of LTE signal. For the 2.4 GHz band, WLAN receive typically uses 20 or 40 MHz bandwidth. For the 5 GHz band, WLAN receive can use 20 MHz, 40 MHz, 80 MHz, 160 MHz, and 80+80 MHz (a discontiguous 160 MHz) BWs. RF level of the LTE harmonic that falls into WLAN receive band depends on different parameters like RF output power of LTE signal, design of high power amplifier for LTE, RF filtering on the LTE path post high power amplifier, antenna isolation between LTE antenna and WLAN antenna.

For some instances, the RF level for the LTE harmonic, when measured at WLAN receive input, can be as high as −70 dBm. WLAN receivers are generally designed to be quite sensitive (with receive sensitivity as low as −95 dBm or even lower) and the co-channel LTE harmonic de-senses WLAN receive, preventing the receiver from receiving packets at low WLAN receive signal levels. Also, in some cases the LTE harmonic appears like a WLAN packet to the WLAN receiver resulting in false packet detection. It is desirable that the WLAN receiver should be able to reliably detect co-channel LTE harmonic and differentiate it from WLAN receive packet. Both LTE uplink packets and WLAN packets use a preamble before control data and user data. The preamble present in each packet can be used to classify the packet and differentiate between LTE harmonic and WLAN receive packet.

Also, carrier aggregation is used in LTE-Advanced to increase the bandwidth, and thereby increase throughput. The LTE-Advanced User Equipment can be allocated uplink resources on the aggregated resource consisting of two or more Component Carriers. Each aggregated carrier is referred to as a component carrier, CC. The component carrier can have a bandwidth of 1.4, 3, 5, 10, 15 or 20 MHz and a maximum of five component carriers can be aggregated, hence the maximum aggregated bandwidth is 100 MHz. The easiest way to arrange aggregation would be to use contiguous component carriers within the same operating frequency band (as defined for LTE), so called intra-band contiguous. This might not always be possible, due to operator frequency allocation scenarios. For non-contiguous allocation, it could either be intraband, i.e. the component carriers belong to the same operating frequency band, but have a gap, or gaps, in between, or it could be inter-band, in which case the component carriers belong to different operating frequency bands.

Support of carrier aggregation on LTE results in IMD3 products generated by LTE power amplifiers that fall into the WiFi band. For example, when the following non-contiguous intra-band channels are used in B41 for carrier aggregation: 1. Center frequency=2510 MHz, 100 RBs, and 2. Center frequency=2560 MHz, 100 RBs.

The above carrier aggregation scheme would result in intermodulation distortion $3^{rd}$ order (IMD3) products that are centered at 2460 MHz and have a ±30 MHz bandwidth. As a result, the IMD3 products would be co-channel to WiFi channels CH7-CH13. The scheme proposed in this disclosure can also discriminate between WLAN receive packet and LTE IMD products generated because of carrier aggregation and apply LTE spur cancellation algorithms to improve the receive performance of WiFi packets.

In many cases the LTE chip and WiFi chip are co-located on the same platform. In that case, it is possible for the LTE chip to tell the WiFi chip about LTE co-channel harmonic or LTE co-channel IMD conditions using a co-existence interface (WCI), such a WCI-2 2-wire universal asynchronous receiver/transmitter (UART) interface.

WLAN packet uses a preamble called legacy Short Training Field (L-STF). For 20 MHz bandwidth reception, the format for the L-STF preamble sequence is as shown below:

$$S_{-26,26} = \left(\sqrt{\frac{1}{2}}\right) \left\{ \begin{array}{l} 0, 0, 1+j, 0, 0, 0, -1-j, 0, 0, 0, 1+j, 0, 0, 0, -1-j, 0, 0, 0, -1, -j, 0, 0, 0, 1+j, 0, 0, 0 \\ 0, 0, 0, 0, -1-j, 0, 0, 0, -1, -j, 0, 0, 0, 1+j, 0, 0, 0, 1+j, 0, 0, 0, 1+j, 0, 0 \end{array} \right\}$$ (Equation 1)

where j denotes the imaginary unit. The LSTF has a total duration of 8 μs and it is periodic with total of ten periodic segments each of which is 0.8 μs in duration.

On LTE uplink, reference signals are used as demodulation reference signals (DM-RS) on physical uplink control channel (PUCCH) and physical uplink shared channel (PUSCH). The properties for the DM-RS sequences included in the LTE uplink include:

Favorable auto-correlation and cross-correlation properties;

Sufficient number of sequences;

Flat frequency domain representation facilitating efficient channel estimation;

Low cubic metric values comparable to the cubic metric of QPSK modulation.

There is one DM-RS in every 0.5 ms slot on PUSCH, whereas on PUCCH, there are 2-3 reference signals per slot depending on the used PUCCH format.

The L-STF for WLAN signal and DM-RS for LTE can be used to classify each of the signals and differentiate between LTE harmonic packet and WLAN receive packet using the correlators.

For example, an autocorrelation metric using L-STF can be used to detect the WLAN packet. The auto-correlation algorithm uses the fact that L-STF is sub-divided into ten segments, and each of the segments transmits the same time domain signal which is 16 samples long. In one implementation, the auto-correlation metric can be computed as follows:

$$S(n) = \sum_{m=0}^{M-1} r^*(n+m-16) r(n+m)$$ (Equation 2)

Where r(n) is the received L-STF (preamble) sequence corrupted by multi-path channel and by Additive White Gaussian Noise (AWGN), M may be the length of the L-STF or only few segments of the L-STF. A WLAN packet is detected when magnitude of S(n) exceeds a correlation threshold.

Additionally or alternatively, for LTE reference signal detection, a periodic cross-correlation algorithm may be used. For example, the periodic cross-correlation algorithm may be used to detect LTE uplink PRACH (Physical Random Access Channel) packet. PRACH packet uses a preamble sequence that belongs to Zadoff-Chu sequences belonging to Constant Amplitude Zero Autocorrelation (CAZAC). The periodic cross-correlation function can be defined as follows:

$$Corr_m = \frac{1}{\sqrt{L}} \sum_{n=0}^{L-1} a_n b^*_{(n-m) \bmod L}$$ (Equation 3)

Where a and b are two CAZAC sequences that have the same prime length L but different k where k is any number which is relatively prime to L. Symbol "*" represents complex conjugate, "mod" is the modulo operation. When a and b are the same sequences, equation (3) changes to an autocorrelation definition. Cross-correlation of two sequences would result in $Corr_m$ equal to zero, and auto-correlation of same sequence would result in $Corr_m$ equal to √L. Again, an LTE uplink PRACH packet is detected when $Corr_m$ exceeds a threshold. Similar algorithms can be used to detect PUSCH (Physical Uplink Shared Channel) and PUCCH (Physical Uplink Control Channel) packets.

The above algorithms are just example implementations and the packet detection and correlations may be achieved using any other suitable correlation algorithms or methods.

Figure 9:
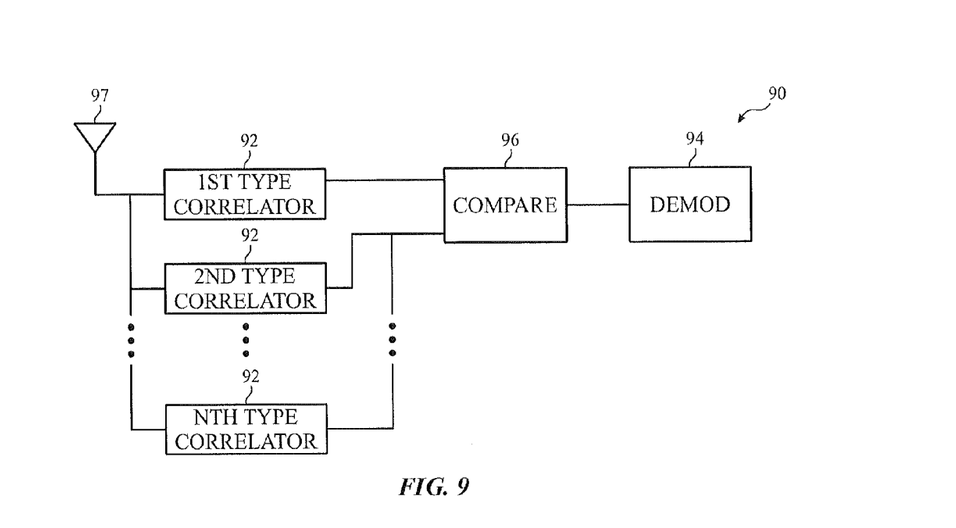
FIG. 9 illustrates a schematic view of an electronic device with multiple correlators in a single channel using a common antenna to verify incoming signals as belonging to a first wireless protocol, according to an embodiment.

Since harmonics may incorrectly be identified as the wrong wireless protocol, some embodiments of the electronic device 10 may include additional correlators to catch harmonic occurrences. For example, FIG. 9 illustrates an electronic device 90, an embodiment of the electronic device 10, with multiple correlators 92 for an antenna 97. Thus, any received signal via the antenna 97 is subjected to multiple correlators 92. If the signal includes harmonics from a communication type other than that to be handled by demodulator 94, the correlator for the respective communication type detects that at least some element of the signal is of the communication type. As discussed below, such harmonics may then be filtered out before being handled by the demodulator 94. Furthermore, the demodulator 94 may send communication to another demodulator indicating presence of the first demodulator type so that the other demodulator can accurately interpret its own communication type signals.

The electronic device 90 includes a comparator 96 that determines which communication types are present in the received signal. Using this data, the demodulator 94 handles the received signal, if the first type correlator 92 determines that the first type is present. Using the comparator 96, the electronic device 90 may logically determine how to treat the signal. For example, a logic high from the first type correlator 92 causes the demodulator 94 to handle the signal, and a logic high from any other type correlators may cause the electronic device to filter such harmonics.

Figure 10:
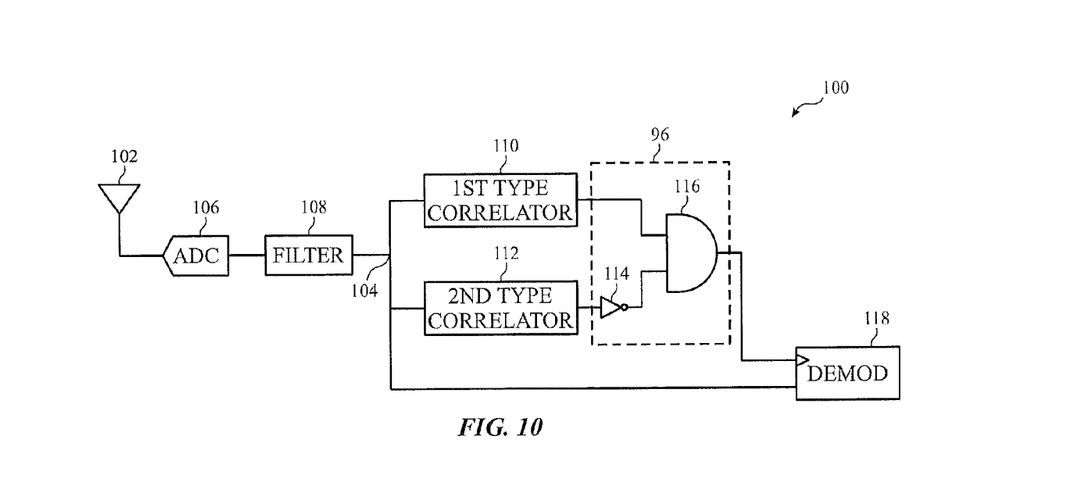
FIG. 10 illustrates a more detailed embodiment of the electronic device of FIG. 9 showing two correlators, according to an embodiment

FIG. 10 illustrates an embodiment of an electronic device 100, an embodiment of electronic device 10, where the electronic device 100 includes an antenna 102 that receives wireless signals. Received signals are split at a splitter 104, but first the signal is converted from an analog signal to a digital signal using an analog-to-digital converter 106. The converted signal is then filtered to adjust the signal using a filter 108 before being split. For example, the filter 108 may be a decimation filter that decreases a sampling rate and/or reduces out-of-band quantization noise. Additionally or alternatively, the filter 108 may include filters to remove other undesired noise, such as cross-channel interference bleeding from another transmitting antenna (not shown) of the electronic device 100. The filtered and converted signal is sent to correlators 110 and 112 that each correlates the signal to a wireless protocol type. For example, the first type correlator 110 may be used to identify signals belonging to a wireless connectivity protocol type, such as an 802.11 network type, and the second type correlator 112 may be used to identify signals belonging to a cellular communication protocol type, such as an LTE network type.

The correlators 110 and 112 may use the correlation algorithms previously discussed or other suitable correlation algorithms. Moreover, as illustrated, the electronic device 100 includes a comparator 96 that includes an inverter 114 and an AND gate 116. The AND gate 116 provides an enable signal to a demodulator 118. The demodulator 118 may includes a demodulator, such as an orthogonal frequency-division multiplexing (OFDM) demodulator that demodulates the signal received from the antenna when the AND gate 116 sends a logic high. The AND gate 116 sends a logic high according to Table 1 below:

TABLE 1

| 1st Type Correlation Verification | | |
|---|---|---|
| 1$^{st}$ Type | 2$^{nd}$ Type | Valid 1$^{st}$ type |
| 0 | 0 | 0 |
| 0 | 1 | 0 |
| 1 | 0 | 1 |
| 1 | 1 | 0 |

Figure 11A:
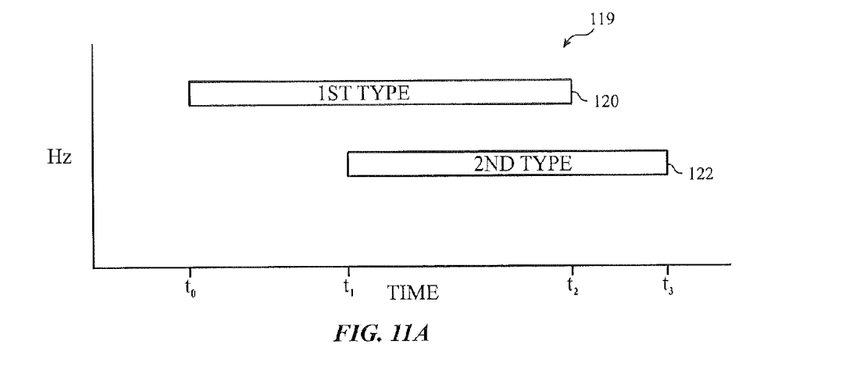
FIG. 11A illustrates a timing diagram of correlated wireless protocols, according to an embodiment.

Thus, when the first type is received without a second type, the signal may be verified as containing the first communication type. Therefore, when the first type correlator determines that a first wireless communication type has been detected without a second wireless communication type also being detected by the second type correlator, the demodulator 118 may interpret a valid data packet of the first wireless protocol type. For example, FIG. 11A illustrates a timing diagram 119, a first type correlation period 120 occurs between time t0 and t2, and a second type correlation period 122 occurs from time t1 to t3. Thus, from time t0 to t1, proper detection of the first wireless protocol type (e.g., WLAN) can be verified. However, from time t1 to t2, it may be ambiguous whether the detected first wireless protocol type is correct or whether the detected first wireless protocol type is falsely identified due to harmonics from the second wireless protocol type. In some embodiments, if the correlation of the first type has preexisted and continued past the beginning of a correlation of the second type, the correlation of the first type may be assumed to be proper.

Figure 11B:
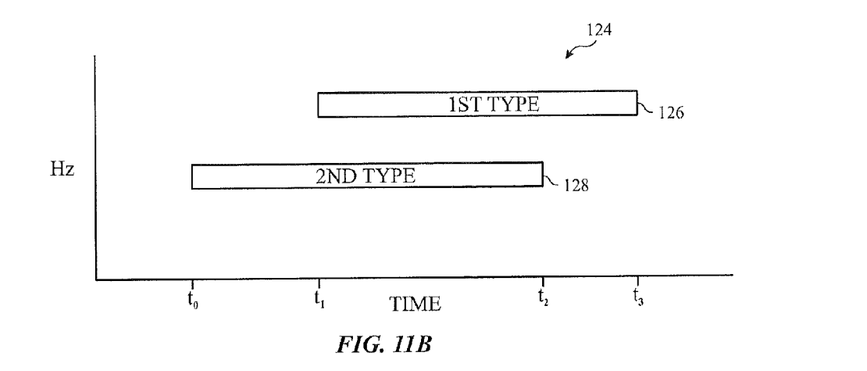
FIG. 11B illustrates another timing diagram of correlated wireless protocols, according to an embodiment.

Additionally or alternatively, as discussed below, the harmonics may be filtered from the received signal prior to interpretation by the demodulator 118 and/or prior to correlation of the first type. If the filtered signal is correlated to the first type, then the correlation has been verified. Such an approach would properly interpret a signal that has a timing diagram 124, as illustrated in FIG. 11B, showing correlation of the first type 126 and the second type 128 even though the first type begins at time t1 after the second type has already began at t0.

Figure 12:
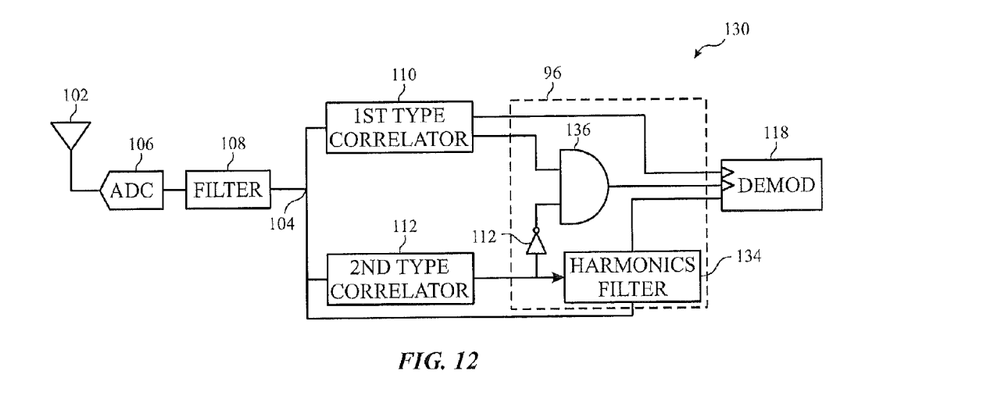
FIG. 12 illustrates a schematic view of the electronic device of FIG. 9 with multiple correlators in a single channel using a common antenna to verify incoming signals as belonging to a first wireless protocol that also selectively filters signals based at least in part on a correlator result, according to an embodiment.

FIG. 12 illustrates an embodiment of an electronic device 130 for filtering harmonics. The electronic device 130 includes components similar to those of the electronic device 100 with a few additions which have been referenced with the same numerals for conciseness and clarity. The electronic device 130 includes additional components in the comparator 96. Specifically, the comparator 96 includes a harmonics filter 134 that filters the received signal when the second type correlator 112 detects the second protocol and/or its harmonics. The harmonics filter 134 filters the second type harmonics when enabled using an enable signal from the second type correlators 112. When the harmonics filter 134 is enabled, it outputs a filtered signal that is fed to the demodulator 118 that is demodulated due to the enable signal. When the harmonics filter 134 is not enabled, the harmonics filter circuitry may pass the signal through and/or the signal may pass through an alternative pathway. Additionally or alternatively, the filtered signal may be passed through a first type correlator to determine whether the first protocol type is actually present in the signal or whether the originally correlated signal was merely a harmonic of the second protocol type. Therefore, the demodulator 118 may demodulate only signals that verified as containing data in the first protocol type. Thus, the electronic device 130 may operate on a received signal based on the following Table 3:

TABLE 2

| Signal treatment | | |
|---|---|---|
| 1$^{st}$ Type | 2$^{nd}$ Type | Valid 1$^{st}$ type |
| 0 | 0 | Do nothing |
| 0 | 1 | Filter harmonics, but do not demodulate |
| 1 | 0 | Demodulate without filtering harmonics |
| 1 | 1 | Filter harmonics and demodulate |

Although the electronic devices 100 and 130 include comparators 96 that are made of individual gates, the comparators 96 may instead by integrated circuits or other logic units that are capable of verifying that the signal contains the first protocol type using the outputs of the correlators 110 and 112 by determining whether the first protocol type is included alone or in combination with the second protocol type.

Figure 13:
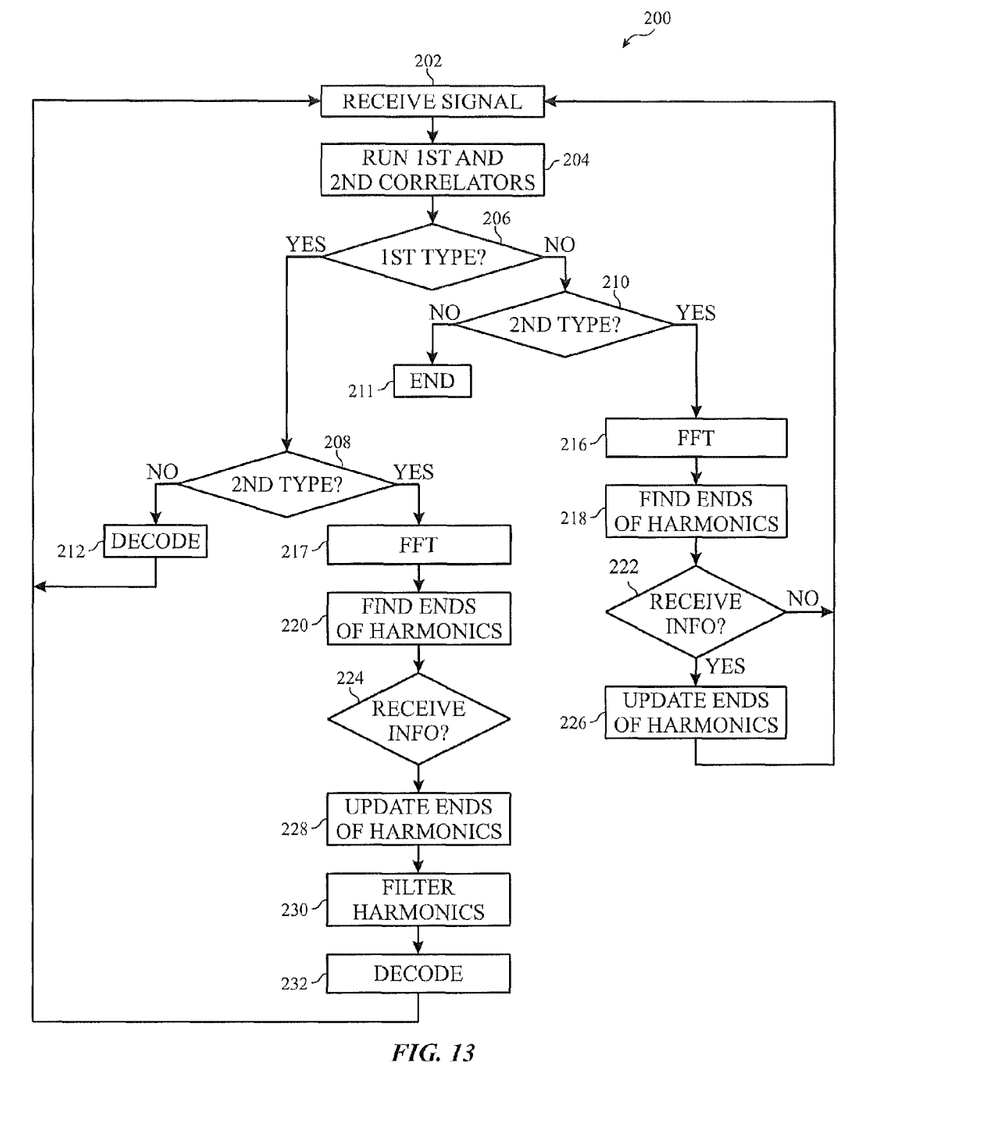
FIG. 13 illustrates a flow chart illustrating a process for verifying correlations and filtering co-channel interference from a received signal, if present, prior to decoding the received signal, according to an embodiment.

FIG. 13 illustrates a process 200 for verifying that a signal includes a communication type. An antenna, such as the antennas 97 and 102, receives a wireless signal (block 202). The first and second correlators run, and the wireless signal is submitted to running first and second correlators (block 204). The correlators (e.g., correlators 110 and 112) are each directed to different wireless protocols. The correlators each determine whether the signal includes data packets of the wireless protocol to which is directed. For example, the first correlator may be a WLAN correlator, and the second correlator may be an LTE correlator. Each correlator may use any suitable correlation algorithm to determine whether the incoming signal includes data from the wireless protocol to which the correlator is directed. A comparator 96 determines whether the signal includes data packets of the first protocol type using the first correlator 110 (block 206). The comparator 96 also determines whether the signal includes electronic signals corresponding to the second protocol type using the second correlator 112 regardless of whether the first type is detected (blocks 208 and 210). If the first type is detected and the second type is not, the demodulator 118 demodulates and decodes the data as belonging to the first protocol type (block 212). If the first type is not detected and the second type is also not detected, the process ends (block 211).

If the second type is detected, the harmonics present in the signal should be reduced. Thus, the harmonics filter performs Fourier transforms on the received samples to derive a frequency spectrum for the sampled signal (blocks 216 and 217). In some embodiments, the Fourier transform may be a high-order (1024 points or above) finite Fourier transforms on the received samples. The harmonics filter also finds end points for the harmonics (blocks 218 and 220). The end points are the minimum frequency and maximum frequency for the harmonics (or other co-channel interference).

In some embodiments, the harmonics filter may receive information about communications via the second protocol type from a channel that is used to receive data in the second protocol type. In such embodiments, the harmonics filter determines whether information about the received data in the second protocol type from another channel (blocks 222 and 224). For example, the harmonics filter may receive information about the frequency spectrum of the co-channel interference from an out-of-band (OOB) communication channel. The harmonics information may be communicated using any available communication interfaces in the system, such as a WCI-2 2-wire interface. If additional data is received from another channel, the harmonics filter updates the endpoints of the co-channel interference (block 228). If the first and second protocol types are both detected, the harmonics filter filters the harmonics based at least in part on the endpoints (block 230). The demodulator 118 then demodulates and decodes the filtered signal (block 232).

In some scenarios, the comparator and the additional correlators may be inactive unless enabled. For example, software may be used to switch on the hardware and/or execute correlation and filtering functionality.

In summary, the foregoing disclosure discusses additional protocol correlators that are used to verify that a correlation of a data signal to a protocol type is proper before decoding the data signal using the protocol type. Additionally, the additional correlators may be used to filter co-channel interference resulting from the wireless protocol types associated with the additional correlators.

It may be understood that the foregoing processes may be embodied using hardware, software, or some combination thereof. For example, at least a portion of the steps may be performed using a processor to perform instructions stored in memory that are configured to cause the processor to perform the portions of the process 200, when executed. For example, the received signals may be at least partially digitally filtered using a processor.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   an antenna configured to receive a wireless signal;
   a first correlator configured to correlate the wireless signal to a communication of a first wireless protocol type, wherein the first wireless protocol type operates using a first frequency band;
   a second correlator configured to correlate the wireless signal to a communication of a second wireless protocol type; wherein the second wireless protocol type operates in a second frequency band, wherein at least one frequency of the second frequency band has a harmonic that falls in the first frequency band;
   a harmonics filter coupled to the second correlator; and
   a demodulator configured to demodulate the received wireless signal based on results from the first correlator and second correlator of the respective first and second wireless protocol types, wherein the demodulator selectively uses the harmonics filter to filter the harmonic in the received wireless signal from the second correlator based at least in part on the first and second correlator correlating the received wireless signal to both the first wireless protocol type and the second wireless protocol type.

2. The electronic device of claim 1 comprising a comparator that verifies that the wireless signal includes frequencies belonging to the first wireless protocol type.

3. The electronic device of claim 2, wherein the comparator is configured to combine correlation results from the first correlator and correlation results from the second correlator to verify that the wireless signal includes frequencies belonging to the first wireless protocol type.

4. The electronic device of claim 3, wherein the comparator comprises a filter configured to filter out frequencies pertaining to the second wireless protocol type from the wireless signal based at least in part on the correlation results from the second correlator.

5. The electronic device of claim 2, wherein the wireless signal comprises co-channel interference corresponding to the second wireless protocol type.

6. A method comprising:
   receiving a wireless signal at an antenna;
   passing the wireless signal through a first correlator configured to correlate the wireless signal to a first wireless protocol type, wherein the first wireless protocol type operates using a first frequency band;
   passing the wireless signal through a second correlator configured to correlate the wireless signal to a second wireless protocol type; wherein the second wireless protocol type operates using a second frequency band that does not overlap the first frequency band, wherein at least one frequency of the second frequency band has a harmonic that falls in the first frequency band;
   passing the wireless signal from the second correlator to a harmonics filter;
   selectively filtering the wireless signal based at least in part on the results of the correlation of first and second correlators; and
   demodulating the wireless signal based on results of the first correlator and the second correlator of the respective first and second wireless protocol types.

7. The method of claim 6, wherein passing the wireless signal through the first correlator occurs substantially simultaneously to passing the wireless signal through the second correlator.

8. The method of claim 7 comprising confirming that the wireless signal corresponds to the first wireless protocol type based at least in part on outputs from the first and second correlators.

9. The method of claim 7, wherein:
   the first wireless protocol type comprises a wireless connectivity protocol; and
   the second wireless protocol type comprises a cellular communication protocol.

10. The method of claim 9, wherein the wireless connectivity protocol comprises a wireless local area network protocol.

11. The method of claim 6 comprising correlating the wireless signal to the first wireless protocol type using an auxiliary correlator to reduce de-sensing caused during correlation prior to filtration of the wireless signal.

12. An electronic device comprising:
   an antenna configured to receive a wireless signal
   a first correlator configured to generate a first result corresponding to whether the wireless signal correlates to a first wireless protocol type, wherein the first wireless protocol type operates using a first frequency band;
   a second correlator configured to generate a second result corresponding to whether the wireless signal correlates to a communication of a second wireless protocol type, wherein the second wireless protocol type operates using a second frequency band, wherein at least one frequency of the second frequency band has a harmonic that falls in the first frequency band;

an inverter configured to invert the second result;

a comparator configured to verify correlation of the wireless signal to the first wireless protocol type based at least in part on results of the second correlator of the second wireless protocol type, wherein the comparator comprises an AND gate configured to receive the first result and the inverted second result and to generate a correlation signal by performing a logic AND on the first result and the inverted second result;

a harmonics filter configured to generate a harmonic-filtered wireless signal by filtering the harmonic from the wireless signal; and a demodulator configured to:
  receive the harmonic-filtered wireless signal and the wireless signal; and
  select between demodulating the harmonic-filtered wireless signal and demodulating the wireless signal based at least in part on the correlation signal.

13. The electronic device of claim 12, wherein the first wireless protocol type comprises a wireless local area network protocol.

14. The electronic device of claim 12, wherein the second wireless protocol type comprises a cellular protocol.

15. The electronic device of claim 12 comprising a filter that filters frequencies pertaining to the second wireless protocol if the wireless signal is correlated to the first wireless protocol type and the second wireless protocol type.

16. The electronic device of claim 15, wherein the filter tracks endpoints of a frequency spectrum of a portion of the wireless signal and filters the portion based on the endpoints.

17. The electronic device of claim 15 comprising a plurality of channels each comprising a respective antenna configured to receive a respective wireless signal, wherein each respective antenna is configured to receive signals of a specific wireless protocol, and the antenna is located in a first channel of the plurality of channels.

18. The electronic device of claim 17, wherein the filter tracks endpoints of a frequency spectrum of a portion of the wireless signal and filters the portion based on the endpoints.

\* \* \* \* \*

UNITED STATES PATENT AND TRADEMARK OFFICE
CERTIFICATE OF CORRECTION

PATENT NO. : 10,523,261 B2
APPLICATION NO. : 15/087989
DATED : December 31, 2019
INVENTOR(S) : Tushar Ramanlal Shah et al.

It is certified that error appears in the above-identified patent and that said Letters Patent is hereby corrected as shown below:

In the Claims

Column 16, Line 8, insert --type-- between "protocol" and "if".

Signed and Sealed this
Seventh Day of April, 2020

Andrei Iancu
*Director of the United States Patent and Trademark Office*